(12) United States Patent
Hubble, III et al.

(10) Patent No.: US 6,355,926 B1
(45) Date of Patent: Mar. 12, 2002

(54) RASTER OUTPUT SCANNER BEAM STEERING

(75) Inventors: Fred F. Hubble, III, Rochester; William J. Nowak, Webster; Robert M. Lofthus, Honeoye Falls; Thomas R. Scheib, Williamson, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/374,167

(22) Filed: Aug. 13, 1999

(51) Int. Cl.[7] .............................. H01J 40/14; B41J 15/14
(52) U.S. Cl. .................. 250/214 R; 250/234; 347/241; 347/258
(58) Field of Search ............................... 347/241, 244, 347/256, 258, 242; 250/214 R, 214 P, 221, 234

(56) References Cited

U.S. PATENT DOCUMENTS 4,821,192 A * 4/1989 Taivalkoski et al. .......... 701/25
5,386,123 A   1/1995 Hubble, III et al. ........ 250/561

OTHER PUBLICATIONS

U.S. Patent application Ser. No. 09/004,455 (Attorney's Docket No. D/97126), filed Jan. 8, 1998, entitled "Color Printer with Jitter Signature Matching".

U.S. Patent application Ser. No. 09/004,762 (Attorney's Docket No. D/97348), filed Jan. 8, 1998, entitled "Moving Mirror Motion Quality Compensation".

U.S. Patent application Ser. No. 09/210,187 (Attorney's Docket No. 97570), filed Dec. 11, 1998, entitled "Flexible Arm Piezoelectric Lens Mover".

* cited by examiner

Primary Examiner—F. L Evans
Assistant Examiner—Zandra Smith
(74) Attorney, Agent, or Firm—John M. Kelly; David E. Henn

(57) ABSTRACT

An apparatus for rapidly determining and correcting the position of a scanning light beam. The apparatus includes a linear position sensor that senses the position of the scan line and a circuit that produces a position signal from the sensed scan line position. A closed loop scan line control system further includes a scan line correction mechanism that adjusts the position of the scan line such that the position of the scan line is corrected for each individual polygon facet. Beneficially, the closed loop scan line correction mechanism includes a mover that moves an optical element, such as a mirror or lens, that adjusts the scan line position.

20 Claims, 8 Drawing Sheets

RASTER OUTPUT SCANNER BEAM STEERING

FIELD OF THE INVENTION

This invention relates to electrophotographic color printers that use raster output scanners. In particular, it relates to rapidly sensing and controlling the position of a scanning laser beam.

BACKGROUND OF THE INVENTION

Electrophotographic marking is a well-known method of copying or printing documents. Electrophotographic marking is performed by exposing a light image representation of a desired final image onto a substantially uniformly charged photoreceptor. In response to that light image the photoreceptor discharges so as to produce an electrostatic latent image of the desired image on the photoreceptor's surface. Toner particles are then deposited onto that latent image so as to form a toner image. That toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

The foregoing broadly describes a black and white electrophotographic marking machine. Electrophotographic marking can also produce color images by repeating the above process once for each color of toner that is used to make the composite color image. For example, in one color process, called the REaD IOI process (Recharge, Expose, and Develop, Image On Image), a charged photoreceptive surface is exposed to a light image which represents a first color, say black. The resulting electrostatic latent image is then developed with black toner to produce a black toner image. The recharge, expose, and develop process is repeated for a second color, say yellow, then for a third color, say magenta, and finally for a fourth color, say cyan. The various latent images and consequently the color toners are placed in a superimposed registration such that a desired composite color image results. That composite color image is then transferred and fused onto a substrate.

The REaD IOI process can be performed in a various ways. For example, in a single pass printer wherein the composite image is produced in a single cycle of the photoreceptor. This requires a charging, an exposing, and a developing station for each color of toner. Single pass printers are advantageous in that they are relatively fast since a composite color image can be produced in one cycle of the photoreceptor.

One way of exposing the photoreceptor is to use a Raster Output Scanner (ROS). A ROS is comprised of a laser light source (or sources) and a rotating polygon having a plurality of mirrored facets. The light source radiates a laser beam onto the polygon facets. That beam reflects from the facets and strikes the photoreceptor, producing a light spot. As the polygon rotates the spot traces lines, referred to as scan lines, on the photoreceptor. The direction of the sweeping spot is called the fast scan direction. By moving the photoreceptor perpendicular to the fast scan direction, as the polygon rotates the spot raster scans the entire photoreceptor. The direction of motion of the photoreceptor is referred to either as the slow scan direction or the process direction. During scanning, the intensity of the laser beam is modulated to produce the desired latent image.

In color electrophotographic printing it is very important that the various color latent images be accurately registered with each other. By registration it is meant that the latent images are produced such that when the various latent images are developed and transferred that the desired composite image results. Registration must be performed in both the process (slow scan) direction and in the fast scan direction. Misregistration causes color errors that are highly noticeable by the human eye.

Various factors lead to misregistration. For example, photoreceptor motion may not be perfect because vibration, motor backlash, gear train interactions, mechanical imbalances, and/or friction, among other factors, can cause the instantaneous position of the photoreceptor to be less than ideal. Another problem is phasing errors. Phasing errors come about because it is very difficult to accurately synchronize the rotation of the polygon with the motion of the photoreceptor. When the photoreceptor is in the proper position to receive the latent image the polygon facet that should reflect the laser beam might be misregistered ±½ of a scan line in the slow scan, i.e., process direction. The result is a misplacement of the image. Another source of misregistration is polygon facet variations. While each polygon facet is desired to be identical to every other facet, in practice this ideal is not met. Variations in facet dimensions, surface characteristics, and facet-to-facet angular variations cause the scan line position to be facet-dependent. Significantly, the present invention is particularly useful in addressing facet-dependent scan line position problems.

Misregistration in the fast scan direction is usually reduced using a start-of-scan sensor that detects when the sweeping spot is at a predetermined location. Using location information the modulation of the laser beam can be controlled such that the latent image starts at the correct fast scan direction location. However, misregistration in the slow scan direction is more difficult to reduce. One approach is to accurately control the photoreceptor's motion. However, because of inertia, backlash, and other mechanical motion problems, as well as phasing errors, this is difficult and expensive to do.

Another approach to reducing slow-scan direction misregistration is "aerial" image control. With aerial image control, instead of precisely controlling the photoreceptor and ROS motions, those elements are allowed to vary slightly and the scan line position is adjusted to reduce misregistration. For example, U.S. Pat. No. 5,287,125 to Appel et al. discloses a raster output scanner that has process direction (slow scan direction) scan line position control. In that patent an error feedback circuit senses the position of a moving photoreceptor. Photoreceptor position errors are used to produce signals that are applied to a piezoelectric actuator. The piezoelectric actuator expands or contracts, moving a pre-polygon lens, which moves the scan line produced on the photoreceptor so as to correct for photoreceptor motion errors. Additionally, U.S. patent application Ser. No. 09/004,762 now U.S. Pat. No. 6,023,286, entitled "MOVING MIRROR MOTION QUALITY COMPENSATION," filed on Jan. 8, 1998 and U.S. patent application Ser. No. 09/210,188, now U.S. Pat. No. 6,141, 031, filed on Dec. 11, 1998 and entitled "AERIAL COLOR REGISTRATION" teach piezoelectric moved mirrors that aerially correct for photoreceptor motion errors. Also see U.S. patent application Ser. No. 09/004,455 now U.S. Pat. No. 6,055,005 entitled "COLOR PRINTER WITH JITTER SIGNATURE MATCHING."

While the references cited above are useful, they have their limitations. In particular they do not correct for facet-dependent position errors. However, the scan line adjustment technique taught in U.S. patent application Ser. No.

09/210,188, which corrects for both photoreceptor position errors and for facet phasing errors, is potentially fast enough to dynamically correct for facet-to-facet variations.

However, to dynamically correct for facet-to-facet variations it is necessary to sense the laser beam's position on the photoreceptor and to correct that scan line position such that the resulting image is properly positioned before the image is actually produced. In practice, the time available to sense and correct is very small.

A prior art scan line sensor is taught in U.S. Pat. No. 5,386,123, by inventors Hubble III et al., issued Jan. 31, 1995, and entitled, "Beam Steering Sensor for a Raster Scanner Using a Lateral Effect Detecting Device." While the teachings of U.S. Pat. No. 5,386,123 are beneficial, those teachings result in sensing the average position of all scan lines over a relatively long (say 20 millisecond) time span. Therefore, the teachings of U.S. Pat. No. 5,386,123 are not suitable for sensing the scan line position from each facet.

Therefore, a new sensor capable of sensing the scan line position from each facet of a multi-faceted raster output scanner polygon would be beneficial. Even more beneficial would be a closed loop control system that senses and corrects the scan line position for each facet of a multi-faceted polygon.

SUMMARY OF THE INVENTION

The principles of the present invention provide for fast scan line position sensing systems, for closed loop scan line position control systems that incorporate fast scan line position sensing systems, and for electrophotographic printers having multifaceted polygon raster output scanners and closed loop scan line position control systems that incorporate fast scan line position sensing systems. Electrophotographic printers according to the principles of the present invention beneficially use their closed loop scan line position control systems to correct the scan line positions for each facet of their multifaceted polygon.

A fast scan line position sensing system according to the principles of the present invention includes a multi-electrode, lateral effect, photodiode sensor that senses the position of scan lines in real time. The fast scan line position sensing system further includes a signal processing circuit. The signal processing circuit includes amplifiers that amplify the photodiode signals, a highpass filter for each amplifier, and an integrator for each highpass filter. The integrators sum the outputs of the highpass filters for each individual scan associated with a single facet. High-speed sample-and-hold circuits temporarily store the integrator outputs. The sum and difference of the signals on the sample-and-hold circuits are then determined by a summing circuit and by a difference circuit. A ratio circuit then determines the ratio of the difference to the sum. The result is a position signal usable for rapidly correcting the scan line position. The signal processing circuit further includes a logic circuit for producing digital signals that control various required timing functions, such as resetting the integrators, enabling the sample-and-hold circuits, and providing a data valid indication.

A closed loop scan line control system according to the principles of the present invention includes a raster output scanner that has a laser for producing a laser beam, and a multifaceted polygon for sweeping that laser beam along a scan line. The closed loop scan line control system further includes a lateral effect photodiode sensor that senses the scan line position and a signal processing circuit for rapidly producing a position signal that depends upon the position of the scan line. The closed loop scan line control system further includes a scan line correction mechanism that adjusts the position of the scan line such that the position of the scan line is corrected for each facet of the polygon. Beneficially, the scan line correction mechanism uses a mover that moves an optical element that adjusts the scan line position.

An electrophotographic printer according to the principles of the present invention includes a moving photoreceptor and a laser-based, raster output scanner having a multifaceted polygon that sweeps the laser beam in a scan line across the photoreceptor. The electrophotographic printer further includes a lateral effect photodiode sensor that senses the position of the scan line, a signal processing circuit for processing the information from the photodiode sensor, and a scan line correction mechanism that corrects the position of the scan line.

BRIEF DESCRIPTION OF THE DRAWINGS

Other aspects of the present invention will become apparent as the following description proceeds and upon reference to.

DETAILED DESCRIPTION OF A PREFERRED EMBODIMENT OF THE INVENTION

Figure 1:
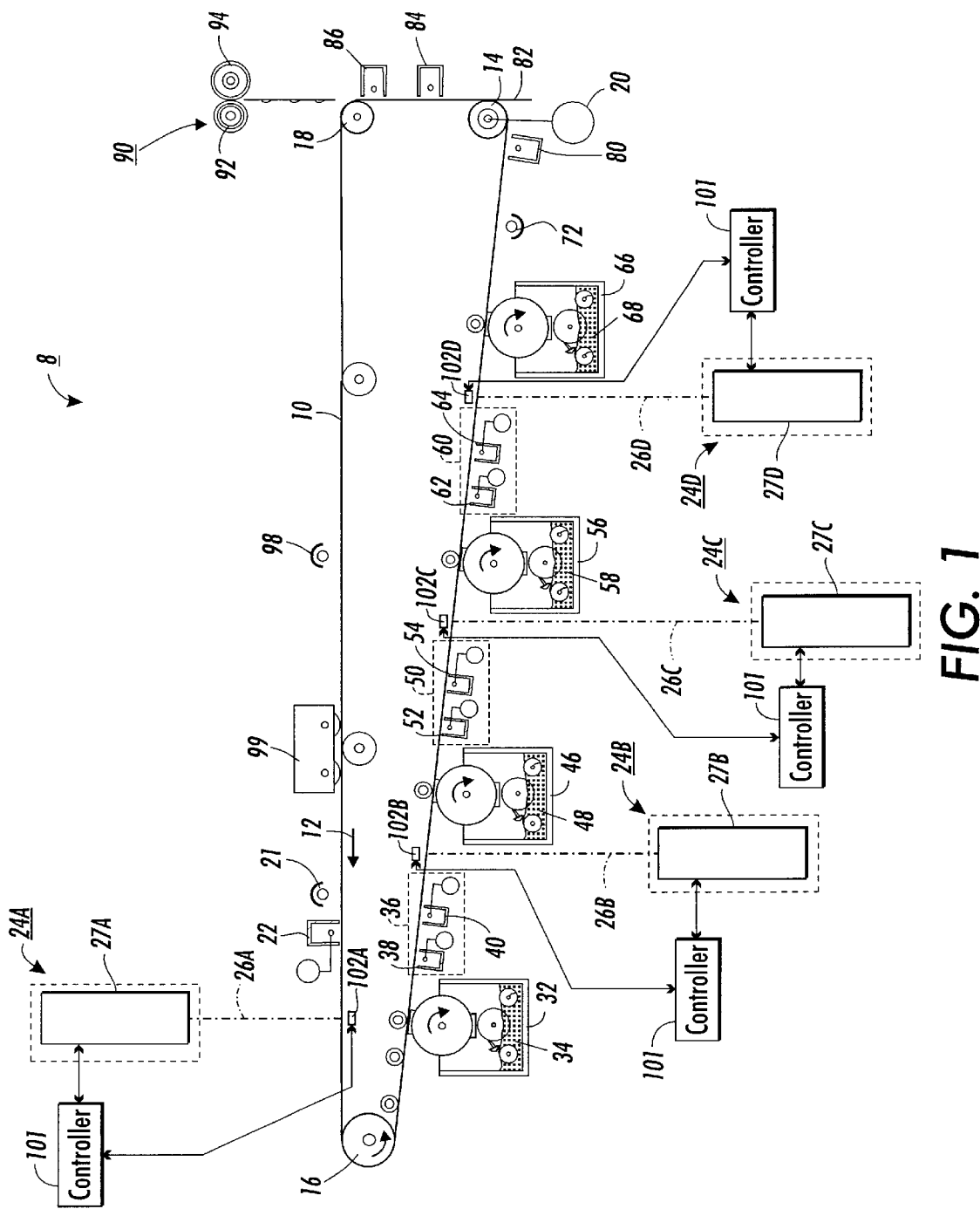
FIG. 1 illustrates an electrophotographic printing machine that incorporates the principles of the present invention.

FIG. 1 illustrates an electrophotographic printing machine 8 that is in accord with the principles of the present invention. The printing machine 8 is a single pass, Recharge-Expose-and-Develop, Image-on-Image (Read IOI) printer. However, it is to be understood that the present invention is applicable to many other types of systems. Therefore, it is to be understood that the following description of the printing machine 8 is only to assist the understanding of the principles of the present invention.

The printing machine 8 includes a photoreceptor belt 10 which travels in the direction indicated by the arrow 12. Belt travel is brought about by mounting the photoreceptor belt about a driven roller 14 and about tension rollers 16 and 18, and then driving the driven roller 14 with a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the printing machine 8.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a corotron 22. The corotron charges the image area in preparation for exposure to create a latent image for black toner. For example, the corotron might charge the image area to a substantially uniform potential of about −500 volts. It should be understood that the actual charge placed on the photoreceptor will depend upon many variables, such as the black toner mass that is to be developed and the settings of the black development station (see below).

After passing the charging station the image area advances to an exposure station 24A. At the exposure station the charged image area is exposed to a modulated laser beam 26A from a raster output scanner 27A that raster scans the image area such that an electrostatic latent representation of a black image is produced. Significantly, the position of the laser beam 26A on the photoreceptor is determined for each facet of a rotating, multi-faceted polygon that is within the exposure station. Using the determined position the scan line position is corrected and the laser beam modulation is controlled such that the black latent image is imaged at a known position on the photoreceptor. A more detailed description of the raster output scanner 27A (as well as the raster output scanners 27B–27D that are discussed below) and the determining and control of the laser beam's position is given subsequently.

Still referring to FIG. 1, after passing the exposure station 24A the exposed image area with the black latent image passes a black development station 32 that advances black toner 34 onto the image area so as to develop a black toner image. Biasing is such as to effect discharged area development (DAD) of the lower (less negative) of the two voltage levels on the image area. The charged black toner 34 adheres to the illuminated parts of the image area. The voltage of the illuminated parts of the image area is about −200 volts. The non-illuminated parts of the image area remain at about −500 volts.

After passing the black development station 32 the image area advances to a recharging station 36 comprised of a DC corotron 38 and an AC scorotron 40. The recharging station 36 recharges the image area and its black toner layer using a technique known as split recharging. Briefly, the DC corotron 38 overcharges the image area to a voltage level greater than that desired when the image area is recharged, while the AC scorotron 40 reduces that voltage level to that which is desired. Split recharging serves to substantially eliminate voltage differences between toned areas and untoned areas and to reduce the level of residual charge remaining on the previously toned areas.

The recharged image area with its black toner layer then advances to an exposure station 24B. There, a laser beam 26B from a raster output scanner 27B exposes the image area to produce an electrostatic latent representation of a yellow image. In a manner similar to that of the laser beam 26A, the position of the laser beam 26B on the photoreceptor is determined and controlled. Furthermore, laser beam 26B is modulated such that the yellow latent image is in superimposed registration with the black latent image. Again, a more detailed description of the raster output scanners (27A–27D) and the determining and control of the laser beam positions are given subsequently.

The now re-exposed image area then advances to a yellow development station 46 that deposits yellow toner 48 onto the image area. After passing the yellow development station the image area advances to a recharging station 50 where a DC scorotron 52 and an AC scorotron 54 split recharge the image area.

An exposure station 24C then exposes the recharged image area. A modulated laser beam 26C from a raster output scanner 27C then exposes the image area to produce an electrostatic latent representation of a magenta image. In a manner similar to that of the laser beam 26B, the position of the laser beam 26C on the photoreceptor is determined and controlled, and the laser beam 26C is modulated such that the magenta latent image is in superimposed registration with the black and yellow latent image. Again, a more detailed description of the raster output scanners (27A–27D) and the determining and control of the laser beam positions are given subsequently.

After passing the magenta exposure station the now re-exposed image area advances to a magenta development station 56 that deposits magenta toner 58 onto the image area. After passing the magenta development station the image area advances another recharging station 60 where a DC corotron 62 and an AC scorotron 64 split recharge the image area.

The recharged image area with its toner layers then advances to an exposure station 24D. There, a laser beam 26D from a raster output scanner 27D exposes the image area to produce an electrostatic latent representation of a cyan image. A more detailed description of the raster output scanners (27A–27D) and the determining and control of the laser beam positions are given subsequently.

After passing the exposure station 24D the re-exposed image area advances past a cyan development station 66 that deposits cyan toner 68 onto the image area. At this time four colors of toner are on the image area, resulting in a composite color image. However, the composite color toner image is comprised of individual toner particles that have charge potentials that vary widely. Directly transferring such a composite toner image onto a substrate would result in a degraded final image. Therefore it is beneficial to prepare the composite color toner image for transfer.

To prepare for transfer a pretransfer erase lamp 72 discharges the image area to produce a relatively low charge level on the image area. The image area then passes a pretransfer DC scorotron 80 that performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 82. Those ions attract the negatively charged toner particles onto the substrate.

As the substrate continues its travel it passes a detack corotron 86. That corotron neutralizes some of the charge on the substrate to assist separation of the substrate from the photoreceptor 10. As the leading edge of the substrate 82 moves around the tension roller 18 the lip separates from the photoreceptor. The substrate is then directed into a fuser 90 where a heated fuser roller 92 and a pressure roller 94 create a nip through which the substrate 82 passes. The combination of pressure and heat at the nip causes the composite color toner image to fuse into the substrate. After fusing, a chute, not shown, guides the substrate to a catch tray, also not shown, for removal by an operator.

After the substrate 82 is separated from the photoreceptor belt 10 the image area continues its travel and passes a preclean erase lamp 98. That lamp neutralizes most of the charge remaining on the photoreceptor belt. After passing the preclean erase lamp the residual toner and/or debris on the photoreceptor is removed at a cleaning station 99. The image area then passes once again to the precharge erase lamp 21 and the start of another printing cycle.

In addition to the elements described above, the printer 8 also includes a system controller 101 (shown in four places in FIG. 1) that controls the overall operation of the printer. The system controller preferably comprises one or more programmable microprocessors that operate in accordance with a software program stored in a suitable memory. Of particular importance to understanding the present invention is that the system controller synchronizes the overall operation the printer 8 and provides video information that modulates the laser beams 26A–26D.

Figure 2:
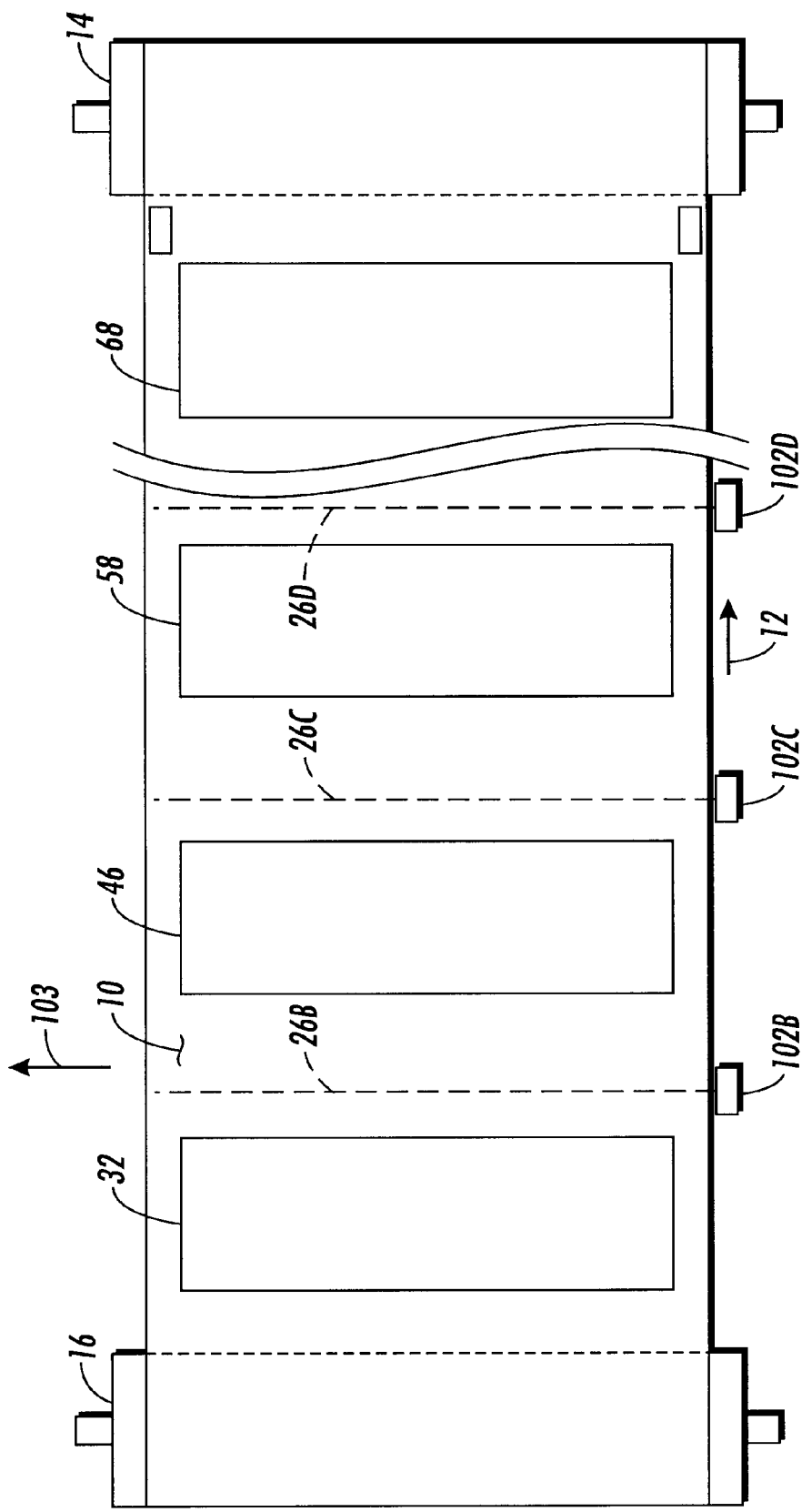
FIG. 2 shows a bottom's up view of the electrophotographic printing machine shown in FIG. 1, but without the raster output scanners.

Still referring to FIG. 1, the system controller 101 receives scan line position information for each of the laser beams. Scan line position information regarding the laser beam 26A is provided by a sensor 102A, scan line position information regarding the laser beam 26B is provided by sensor 102B, scan line position information regarding the laser beam 26C is provided by sensor 102C, and scan line position information regarding the laser beam 26D is provided by sensor 102D. FIG. 2, a simplified bottom's up view of the printer 8 with the raster output scanners removed, may be useful in understanding the sensors 102A–102D. Sensor 102B is located slightly downstream of the black development station 32 on one side of the photoreceptor. Likewise, the sensor 102C is located slightly downstream of the yellow development station 46, and the sensor 102D is located slightly downstream of the magenta development station 58. The laser beams 26B–26D sweep scan lines across the photoreceptor in the direction 103 such that the laser beams respectively cross the sensors 102B–102D. It is to be understood the sensor 102A is located along side the top of the photoreceptor and is not shown in FIG. 2 (however, it is shown in FIG. 1).

While FIG. 2 shows the sensors 102B–102D as being along one side of the photoreceptor, this is not necessary. Indeed, the sensors can be located elsewhere, for example inside the raster output scanners. What is important is that the sensors are located such that the positions of the scan lines on the photoreceptor can be determined, either directly or indirectly.

Figure 3:
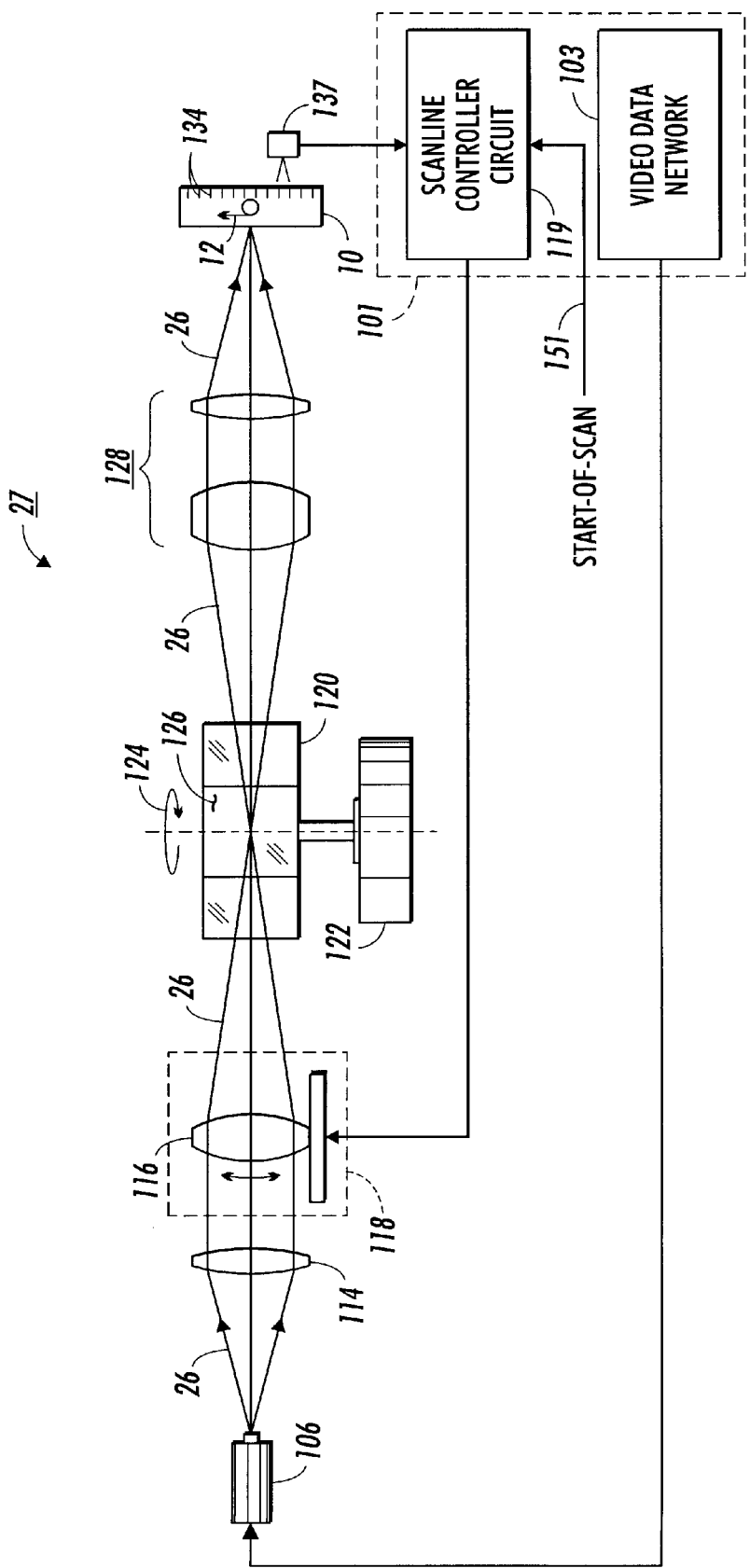
FIG. 3 shows a partial side view of an exposure station used in the electrophotographic marking machine shown in FIG. 1.
Figure 4:
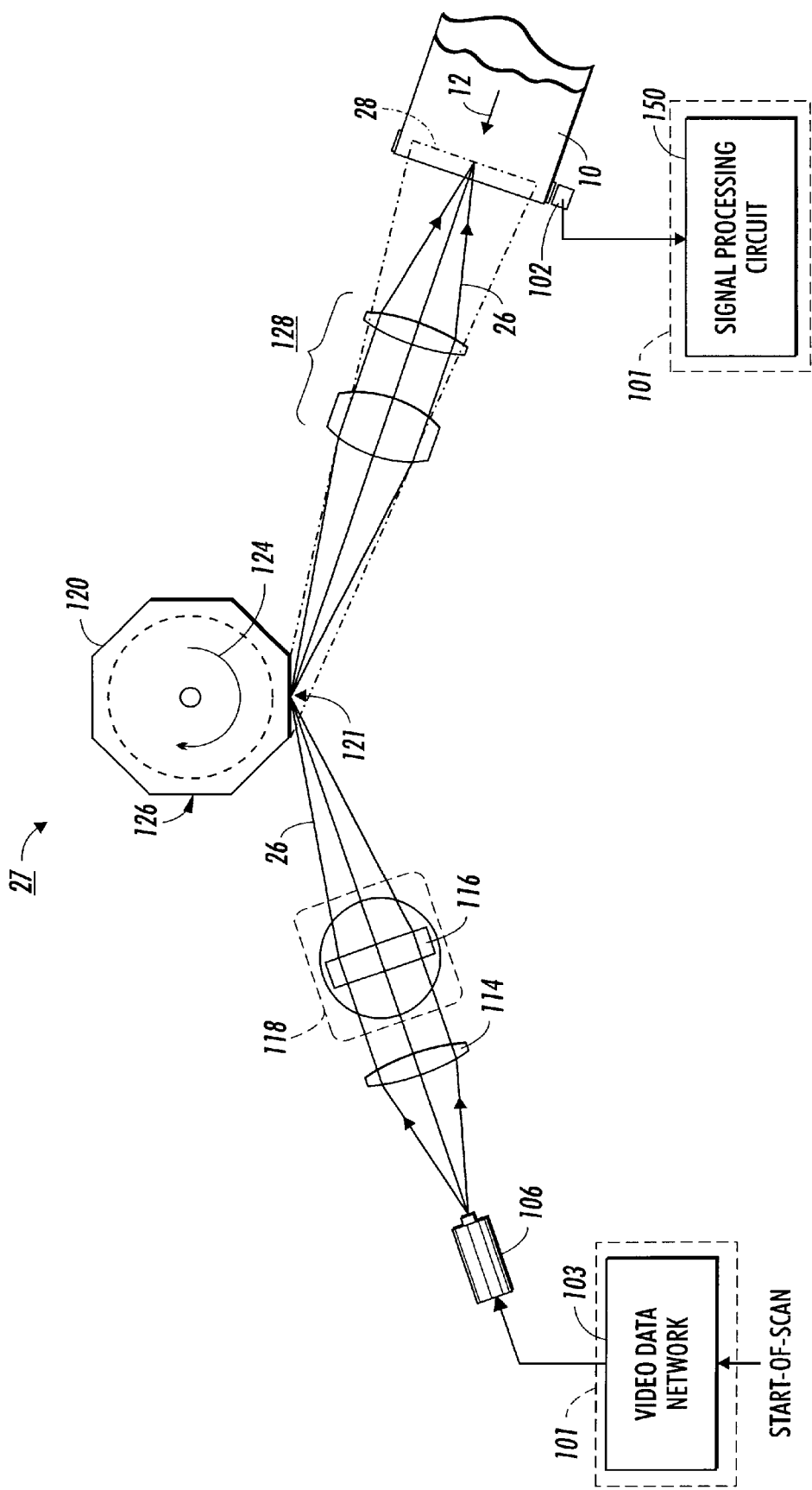
FIG. 4 shows a partial top-down view of the exposure station of FIG. 3.
Figure 5:
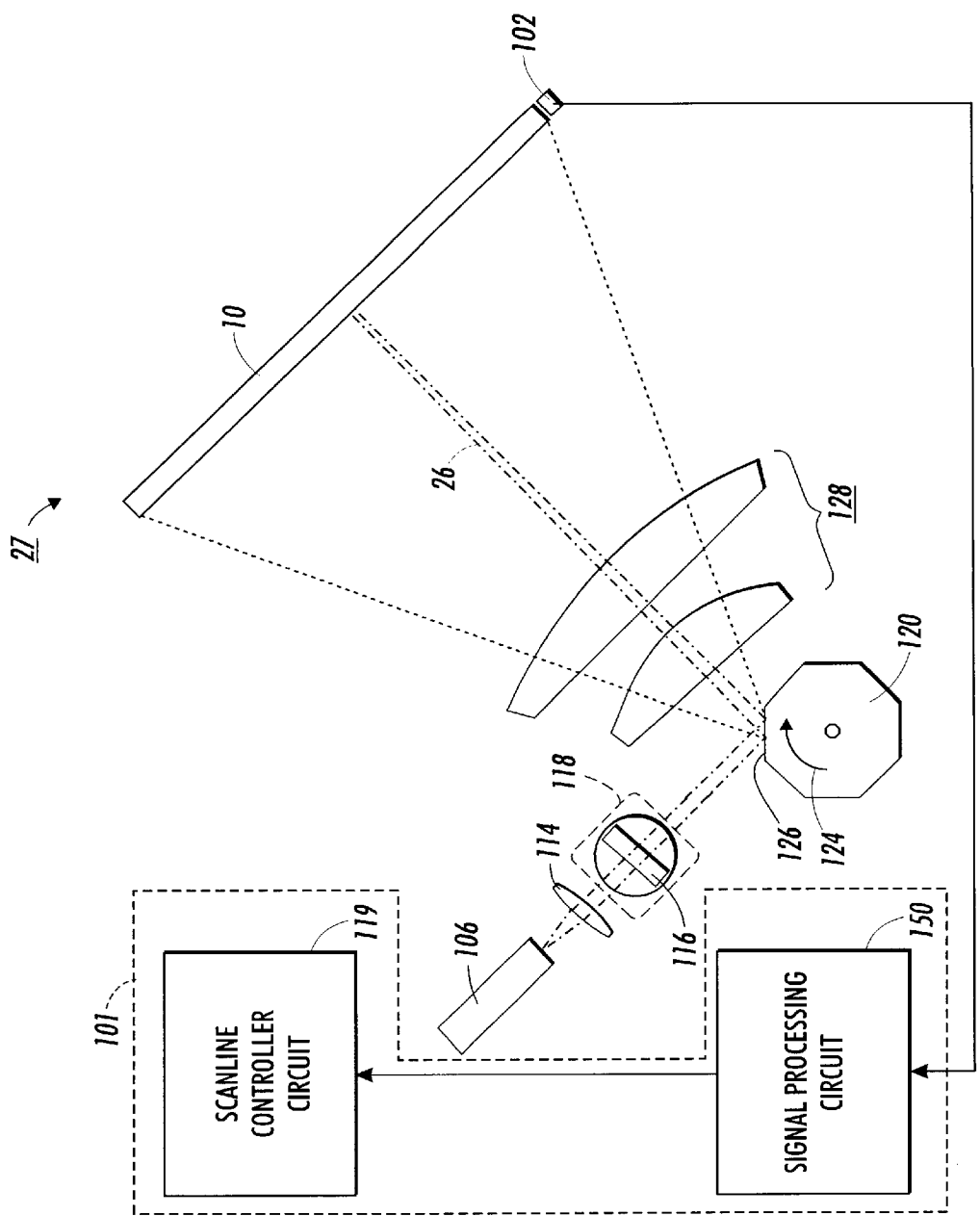
FIG. 5 shows another partial view of the exposure station of FIG. 3, with particular emphasis on facet detection.

FIGS. 3, 4, and 5 present various views of a typical raster output scanner 27. Referring now primarily to FIGS. 3 and 4, a video data circuit 103 within the controller 101 applies video data to a laser 106. In response, the laser produces a laser beam 26 that is modulated according to the video data. As emitted the laser beam 26 is diverging. Referring now to FIGS. 3, 4, and 5, a spherical lens 114 collimates that diverging beam, which then enters a cylindrical lens 116 that focuses the beam in the slow scan (process) direction onto a polygon 120 having a plurality of mirrored facets 126. Referring now mostly to FIG. 3, a piezoelectric actuator assembly 118 moves the cylindrical lens 116 in one plane in response to signals from a scan line controller circuit 119, which is also part of the controller 101. The operation of the scan line controller circuit is described subsequently.

Referring now to FIGS. 3, 4, and 5 as required, a motor 122 rotates the polygon 120 in a direction 124. This rotation causes the facets to sweep the laser beam in a scan plane. The sweeping laser beam passes through a post-scan optical system 128 that reconfigures the beam into a circular (or elliptical) cross-section and that refocuses that laser beam 26 onto the surface of the photoreceptor 10. The post-scan optics also corrects for various problems such as scan non-linearity (f-theta correction) and wobble (scanner motion or facet errors). As shown most clearly in FIG. 4, the deflecting laser beam forms a scan line 28 on the photoreceptor 10.

Referring mostly to FIG. 3, the position of the cylinder lens 116 influences the slow scan (process) direction location of the spot, and thus of the scan line, on the photoreceptor 10. If the cylinder lens is moved up or down the location of the scan line is moved in the slow scan direction an amount that depends on the system's magnification. For example, in one embodiment, if the cylinder lens moves 100 microns vertically, the scan line advances (in the direction 12) on the photoreceptor by 60 microns. Position signals applied to the piezoelectric actuator assembly 118 by the scan line controller circuit 119 cause the piezoelectric actuator assembly 118 to move the cylindrical lens 116, and thus the position of the scan line 28.

Figure 6:
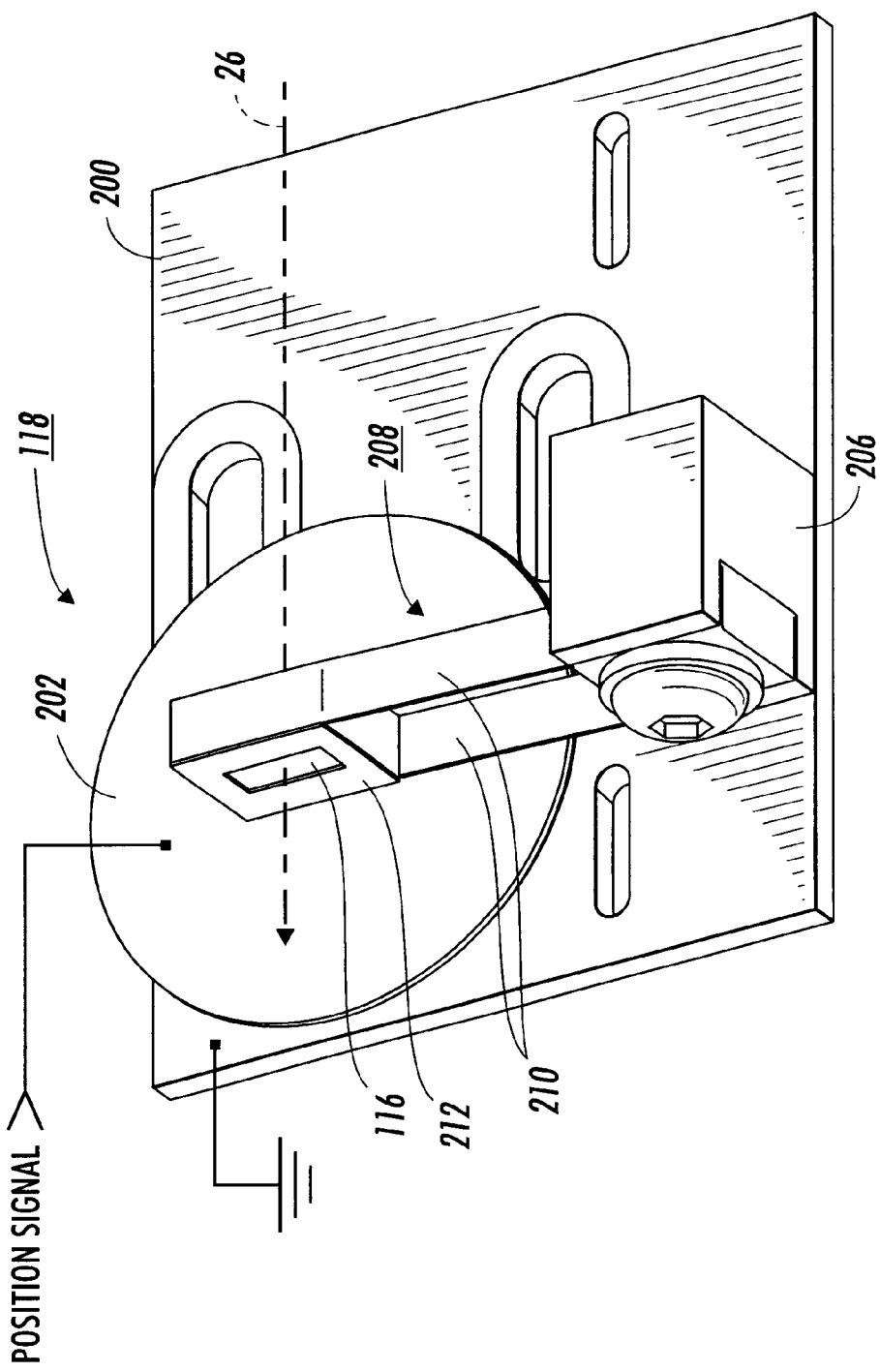
FIG. 6 illustrates a piezoelectric-actuated lens mover that is used in the raster output scanners of the electrophotographic marking machine shown in FIG. 1.

FIG. 6 illustrates a generic piezoelectric actuator assembly 118 used in the printer 8. That assembly includes a mounting frame 200, which is beneficially used to also mount the laser diode 106. However, that is not required and FIG. 6 only shows the laser beam 26. A piezoelectric disk 202 having metal-plated surfaces is mounted on the mounting frame 200 such that the one of the metalplated surfaces connects to the mounting frame. The mounting frame acts as an electrical ground for the piezoelectric disk (alternatively this electrical ground connection can be made to the piezoelectric disk using a wire). The other metalplated surface receives via a wire the motion error signal. The position signal is applied across the piezoelectric disk so as to induce that disk to expand and contract.

One beneficial piezoelectric disk is a high displacement actuator sold as "Rainbow" by Aura Ceramics. Other options include stacking multiple piezoelectric disks together.

Also mounted to the mounting frame 200 is an arm mount 206. Attached to that mount is a flexible arm assembly 208. That assembly is comprised of two flexible arms 210 that are flexible in the direction that is normal to the surface of the mounting frame 200, but that are rigid in the direction that is parallel to the surface of the mounting frame. At the end of the flexible arm assembly is a lens holder 212 that holds the pre-polygon cylinder lens 116. The flexible arm assembly mounts to the arm mount 206 such that the flexible arms 210 are biased toward the piezoelectric disk 202. The rigidity of the flexible arms maintains the cylindrical lens at the proper focal position relative to the laser diode. Furthermore, the rigidity of the flexible arms enables the piezoelectric element to control the spot position in the slow scan (process) direction without rotating or otherwise perturbing the cylinder lens in an undesirable direction. Fundamental mechanical properties of dual flexure arms allow this motion while minimizing undesired motion of the cylinder lens, including rotation about and translation along the axis formed by the laser beam path or the axis which defines the cylinder lens curved surface.

While the principles of the present invention are directed to compensating scan line position errors for facet-dependent scan line position errors, the printer 8 also compensates for photoreceptor position errors. Photoreceptor position errors are determined using a plurality of evenly spaced timing marks 134 on the photoreceptor 10, see FIG. 3. A photosensor 137 senses those timing marks and applies timing signals to the scan line controller circuit 119. Alternatively, timing signals could be generated using a shaft encoder mounted on a photoreceptor roller. In either event, the scan line controller circuit 119 electronically determines when and by how much the photoreceptor's position varies from ideal (since the photoreceptor should move at a constant rate, variations from that rate produce photoreceptor position variations). The scanline controller circuit 119 then determines and applies the correct position signal to the piezoelectric actuator assembly 118 such that the cylindrical lens 116 is moved the proper amount and in the proper direction to correctly position the scan line on the photoreceptor. This is particularly advantageous when printing in color since by correctly positioning the scan line produced by each of the raster output scanners 27A–27D a properly registered color image can result.

Facet-dependent scan line position errors are compensated via aerial control of the scan line position. As mentioned in the "Background of the Invention" while each facet is ideally identical, in practice this ideal is not meet. According to the principles of the present invention the position of the scan line 28 swept by each facet of the multi-faceted polygon is determined. Then, using the error between that determined position and a desired position, the scan line controller circuit 119 causes the cylindrical lens 116 to move such that the resulting scan line is at the desired location. In general, this process requires a sensor that rapidly senses the position of the scan line, an error determining circuit for determining the error and producing a position correction signal, and a position correction mechanism that rapidly moves the scan line to the correct position. The position correction mechanism (the piezoelectric actuator assembly 118, the cylindrical lens 116, and the associated elements) is described above. The remaining major sections are described below.

The scan line sensors are lateral effect photodiodes. "Lateral-Effect Photodiodes" by Kelly, published in Laser Focus, March 1976, describes lateral effect photodiodes that determine the displacement of a light spot that impinges on the active area of the photodiode. Also see U.S. Pat. No. 5,386,123.

Figure 7:
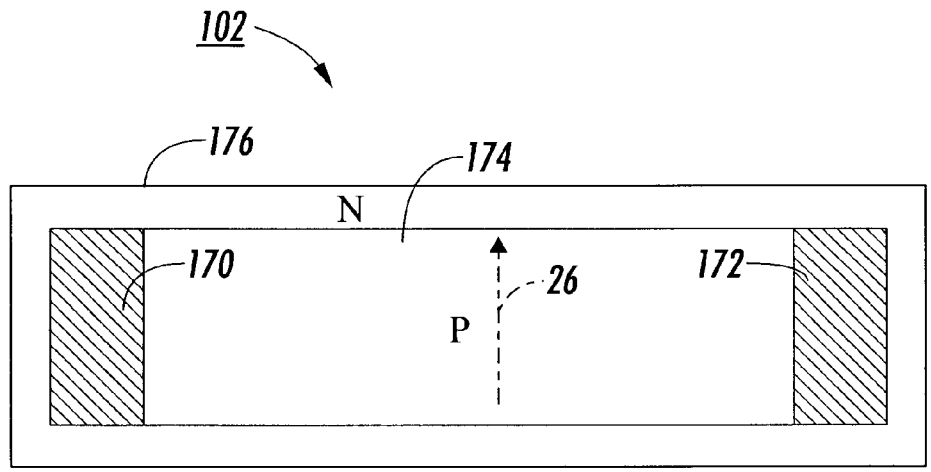
FIG. 7 is an illustration of the top view of a lateral effect photodiode sensor.
Figure 8:
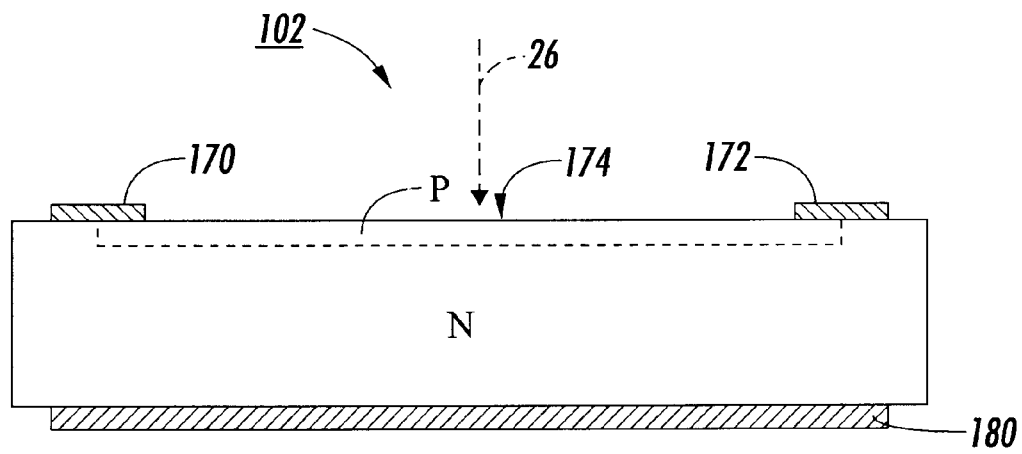
FIG. 8 is an illustration of the side view of a lateral effect photodiode sensor.

FIGS. 7 and 8 are orthographic illustrations of the top and side views of a typical lateral effect photodiode sensor 102. Specifically, as illustrated by FIG. 7, the sensor 102 includes a pair of top electrodes, 170 and 172, that are disposed on opposite ends of a P on N (or an N on P) photodiode 176, where P and N represent the dopant types within an active photodiode region 174. For example, a suitable photodiode for this application might be a 3 millimeter by 1 millimeter single-axis lateral photodiode which is commercially available from United Detector Technology (UDT), Model #SL3-2.

As a laser beam 26 travels across the sensor 102, electron-hole pairs are produced in the bulk of the silicon. Those pairs separate and travel to their respective electrodes. The electrons are collected by a single electrode 180 located on the bottom of the photodiode, per FIG. 8. The holes may travel to either of the top electrodes 170 and 172. If the laser beam sweeps across the middle of the sensor 102 the holes will evenly divide between the two top electrodes. However, if the laser beam is closer to one of the top electrodes, more holes will travel to that closer electrode. By differentially detecting the currents at the top electrodes the position of the laser beam along the sensor's axis can be determined.

Referring now to FIGS. 4 and 5, a signal processing circuit 150 within the controller 101 receives the outputs of the sensor 102. Based upon the sensor's outputs the signal processing circuit produces a scan line position signal that is applied to the scan line controller 119, per FIG. 5. The scan line controller uses the position signal to determine the drive signal that is to be applied to the piezoelectric lens mover 118 such that the lens 116 moves to the proper position to correct for facet-dependent deviations.

Figure 9:
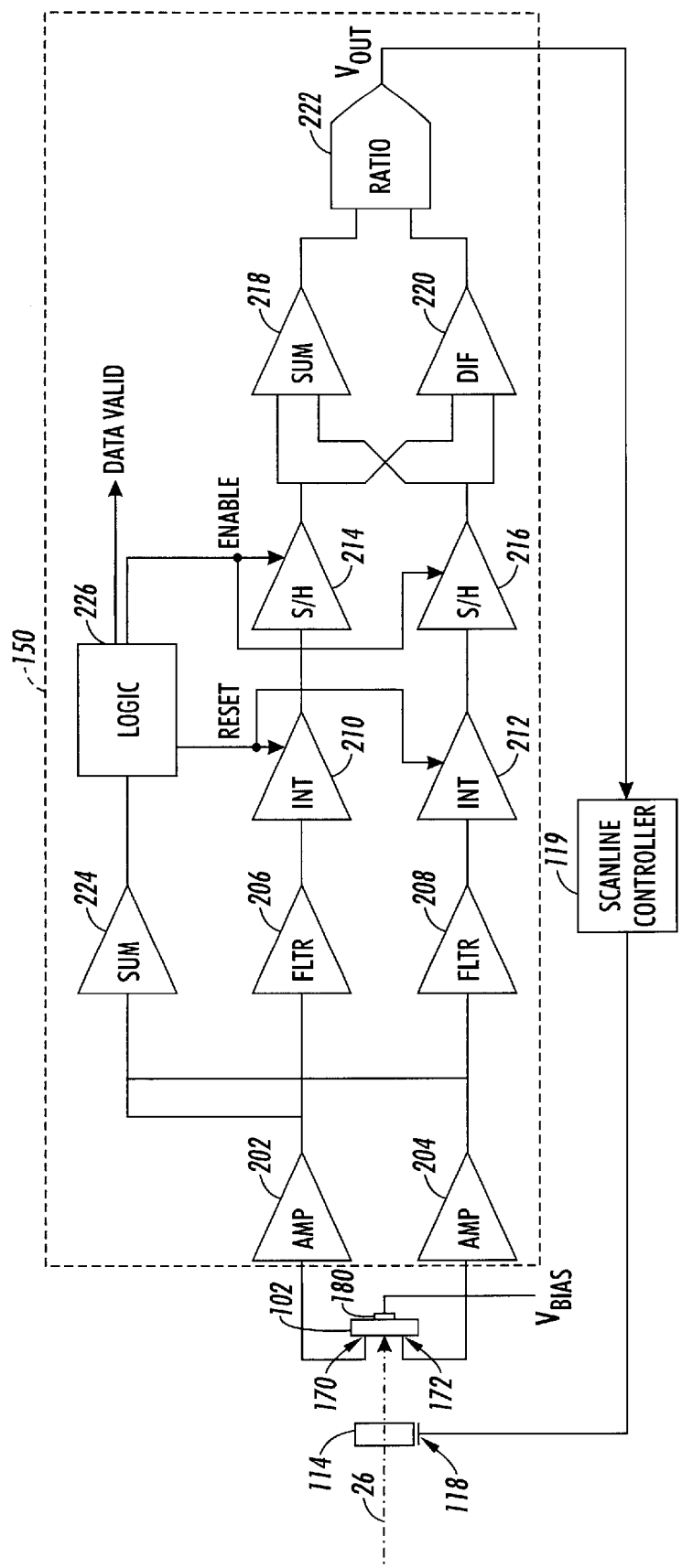
FIG. 9 is a schematic diagram of the electronics of a fast scan line position sensing system.

A block diagram of the signal processing circuit 150 and some associated components are shown in FIG. 9. The laser beam 26 sweeps across the sensor 102 that produces signals on the electrodes 170 and 172. A bias voltage is applied to the common electrode 180 in order to increase the speed of response of the diode and to enhance carrier collection efficiency. The signals on the electrodes are applied respectively to amplifiers 202 and 204. The amplifiers amplify their input signals and send amplified versions to highpass filters 206 and 208, respectively. The highpass filters attenuate the low frequency and DC components of the signals on their inputs and apply their filtered outputs to integrators 210 and 212. The integrators sum their input signals over time and apply their outputs to high-speed sample-and-hold circuits 214 and 216. The sum of the signals on the sample-and-hold circuits 214 and 216 is then determined by a summing circuit 218 and the difference of the signals is determined by a difference circuit 220. A ratio circuit 222 then determines the ratio of the difference to the sum. Various timing functions, such as resetting the integrators and sample-and-hold circuits are provided via a summing circuit 224 that sums signals from the amplifiers 202 and 204 so as to generate a logic synchronization signal for a logic circuit 226. The logic circuit 226 generates a reset signal that causes the integrators to begin summing from, an enable signal that causes the sample and hold circuits to hold the integrator outputs, and a data valid indication signal that informs other circuits that data from the signal processing circuit is valid. As previously mentioned the output of the ratio circuit 222 is applied as a position correction signal to the scan line controller circuit 119.

It is to be understood that while the figures and the above description illustrate the present invention, they are exemplary only. Others who are skilled in the applicable arts will recognize numerous modifications and adaptations of the illustrated embodiments that remain within the principles of the present invention. Therefore, the present invention is to be limited only by the appended claims.

What is claimed:

1. An apparatus for sensing the position of a radiant energy beam, comprising:

a lateral effect photodiode for receiving a radiant energy beam, said lateral effect photodiode having an active region, a common electrode, a first electrode and a second electrode, wherein an electrical signal generated within said active region by said radiant energy beam divides between said first electrode and said second electrode to form a first electrical signal and a second electrical signal, wherein the ratio of said first electrical signal to said second electrical signal depends upon a position of said radiant energy beam on said active region;

a first amplifier for amplifying said first electrical signal;

a second amplifier for amplifying said second electrical signal;

a first integrator for summing the amplified first electrical signal over a time period determined by a reset signal;

a second integrator for summing the amplified second electrical signal over said time period determined by said reset signal;

a first sample and hold for holding the summed output of said first integrator at a time determined by an enable logic signal;

a second sample and hold for holding the summed output of said second integrator at a time determined by said enable logic signal;

an arithmetic circuit receiving said held output of said first sample and hold and said held output of said second sample and hold, said arithmetic circuit for producing an electrical signal representation of the position of the radiant energy beam on the active region;

a summing circuit receiving said amplified first electrical signal and said amplified second electrical signal, said summing circuit for summing said first electrical signal and said amplified second electrical signal to produce a logic trigger; and a logic circuit receiving said logic trigger, said logic circuit producing said reset signal and said enable signal.

2. An apparatus according to claim 1, wherein said arithmetic circuit includes a summing circuit, a difference circuit, and a ratio determining circuit.

3. A scan line control system, comprising;

a laser source producing a laser beam;

a movable optical element receiving said laser beam and applying said laser beam along a path whose position depends upon a position of said optical element;

a mechanism receiving said laser beam on said path, said mechanism for sweeping said laser beam in a scan line plane, wherein a spatial position of said scan line plane depends upon said path position;

a beam position detecting apparatus positioned to receive said sweeping laser beam, said beam position detecting apparatus including;

a lateral effect photodiode for receiving said sweeping laser beam, said lateral effect photodiode having an active region, a common electrode, a first electrode and a second electrode, wherein an electrical signal generated within said active region by said sweeping laser beam divides between said first electrode and said second electrode to form a first electrical signal and a second electrical signal, wherein the ratio of said first electrical signal to said second electrical signal depends upon a position of said sweeping laser beam on said active region;

a first amplifier for amplifying said first electrical signal;

a second amplifier for amplifying said second electrical signal;

a first integrator for summing the amplified first electrical signal over a time period determined by a reset signal;

a second integrator for summing the amplified second electrical signal over said time period determined by said reset signal;

a first sample and hold for holding the summed output of said first integrator at a time determined by an enable logic signal;

a second sample and hold for holding the summed output of said second integrator at a time determined by said enable logic signal;

an arithmetic circuit receiving said held output of said first sample and hold and said held output of said second sample and hold, said arithmetic circuit for producing an electrical signal representation of the position of said sweeping laser beam on the active region;

a summing circuit receiving said amplified first electrical signal and said amplified second electrical signal, said summing circuit for summing said first electrical signal and said amplified second electrical signal to produce a logic trigger; and a logic circuit receiving said logic trigger, said logic circuit producing said reset signal and said enable signal;

a correction circuit receiving said electrical signal representation of the position of said sweeping laser beam, said correction circuit for comparing said electrical signal representation of the movable lens with a correct position of said sweeping laser beam, said correction circuit further for producing a correction signal based upon said comparison; and a position correction mechanism for moving said movable optical element such that the scan line plane moves toward said correct position.

4. An apparatus according to claim 3, wherein said arithmetic circuit includes a summing circuit, a difference circuit, and a ratio determining circuit.

5. An apparatus according to claim 3, wherein said position correction mechanism includes a piezoelectric-actuated mover assembly.

6. An apparatus according to claim 5, wherein said piezoelectric-actuated mover assembly includes a holder that holds said movable optical element.

7. An apparatus according to claim 5, wherein said mechanism for sweeping said laser beam in a scan line plane includes a rotating polygon having a plurality of facets.

8. An apparatus according to claim 7, wherein said position correction mechanism moves said movable optical element to correct each scan line plane produced by each individual facet.

9. An apparatus according to claim 3, wherein said logic circuit further produces a valid data signal.

10. A laser printer, comprising:

a charged photoreceptor moving in a process direction;

a video data source producing video data signals;

a raster output scanner receiving said video data signals, said raster output scanner for exposing said charged photoreceptor such that a latent image representation of said video data signals is produced on said photoreceptor, said raster output scanner including:

a laser source producing a laser beam that is modulated in accordance with said video data signals;

an optical element receiving said modulated laser beam;

a rotating polygon having a plurality of facets for sweeping said laser beam as a scan line on said photoreceptor so as to produce a plurality of output scan lines; and a piezoelectric-actuated optical element mover assembly holding said optical element and moving said optical element in response to a scan line position control signal;

a scan line position detecting apparatus positioned to receive said sweeping laser beam, said scan line position detecting apparatus including;

a lateral effect photodiode for receiving said sweeping laser beam, said lateral effect photodiode having an active region, a common bias electrode, a first electrode and a second electrode, wherein an electrical signal generated within said active region by said sweeping laser beam divides between said first electrode and said second electrode to form a first electrical signal and a second electrical signal, wherein the ratio of said first electrical signal to said second electrical signal depends upon a position of said sweeping laser beam on said active region;

a first amplifier for amplifying said first electrical signal;

a second amplifier for amplifying said second electrical signal;

a first integrator for summing the amplified first electrical signal over a time period determined by a reset signal;

a second integrator for summing the amplified second electrical signal over said time period determined by said reset signal;

a first sample and hold for holding the summed output of said first integrator at a time determined by an enable logic signal;

a second sample and hold for holding the summed output of said second integrator at a time determined by said enable logic signal;

an arithmetic circuit receiving said held output of said first sample and hold and said held output of said second sample and hold, said arithmetic circuit for producing an electrical signal representation of the position of said sweeping laser beam on said active region;

a summing circuit receiving said amplified first electrical signal and said amplified second electrical signal, said summing circuit for summing said first electrical signal and said amplified second electrical signal to produce a logic trigger; and a logic circuit receiving said logic trigger, said logic circuit producing said reset signal and said enable signal; and a scan line controller receiving said electrical signal representation of the position of said sweeping laser beam, said correction circuit for comparing said electrical signal representation of the movable lens with a correct position of said sweeping laser beam, said correction circuit further for producing said scan line position control signal based upon said comparison such that said piezoelectric-actuated optical element mover assembly moves said optical element such that said scan line plane moves toward said correct position of said sweeping laser beam.

11. A laser printer according to claim 10, wherein said arithmetic circuit includes a summing circuit, a difference circuit, and a ratio determining circuit.

12. A laser printer according to claim 10, wherein said piezoelectric-actuated optical element mover assembly corrects each scan line plane.

13. A laser printer according to claim 10, wherein said scan line position control signal causes said piezoelectric element to expand or contract such that said optical element moves.

14. A laser printer according to claim 10, further includes a photoreceptor position sensor that sends photoreceptor position information to said scan line controller, and wherein said scan line controller uses said photoreceptor position information to determine said correct position of said sweeping laser beam.

15. A laser printer according to claim 14, wherein said photoreceptor position sensor senses a plurality of timing marks on said photoreceptor.

16. A laser printer according to claim 10, wherein said optical element is a cylinder lens.

17. A laser printer according to claim 10, wherein said piezoelectric-actuated optical element mover assembly includes:

a mounting frame;

a piezoelectric element connected to said mounting frame;

a flexible arm assembly operatively connected to said mounting frame and having at least two flexible arms and a lens mount, wherein said flexible arms can flex in a direction of motion of the piezoelectric element, wherein said flexible arms are substantially rigid in another direction, and wherein said flexible arm assembly is mounted such that said flexible arms are biased toward said piezoelectric element; and an optical element attached to said lens mount.

18. The laser printer according to claim 17, wherein said position signal is applied to said piezoelectric element.

19. A laser printer according to claim 18, wherein said flexible arms can flex in a direction that is substantially perpendicular to said laser beam.

20. A laser printer according to claim 19, wherein said flexible arms are substantially rigid in a direction that is substantially parallel to said laser beam.

* * * * *